Aug. 27, 1968   J. R. POWELL, JR   3,399,315
ONCE-THROUGH LIQUID METAL PISTON MHD GENERATOR
Filed Sept. 22, 1965

INVENTOR.
JAMES R. POWELL JR.

United States Patent Office 3,399,315
Patented Aug. 27, 1968

3,399,315
ONCE-THROUGH LIQUID METAL PISTON
MHD GENERATOR
James R. Powell, Jr., Rocky Point, N.Y., assignor to the United States of America as represented by the U.S. Atomic Energy Commission
Filed Sept. 22, 1965, Ser. No. 489,439
3 Claims. (Cl. 310—11)

ABSTRACT OF THE DISCLOSURE

A liquid metal magnetohydrodynamics generator in which mercury is vaporized and the pressure thereof is utilized to pump slugs of mercury down a tube subject to a magnetic field and containing electrodes to tap the EMF developed. Entrance to the tube is exposed to a fluctuating level of liquid mercury to produce the slugs in the tube.

---

The invention described herein was made in the course, of, or under a contract with the U.S. Atomic Energy Commission.

The present invention concerns a once-through liquid metal magnetohydrodynamics (MHD) generator for the direct conversion of heat to electricity.

In a conventional power plant, a working fluid is heated to provide the energy for a prime mover which in turn drives electrical generation apparatus.

During recent years there has been increasing interest in the so-called "direct conversion" heat engines in which heat is converted more directly into electricity. Photoelectric, thermionic, fuel cell, thermoelectric, and magnetohydrodynamic (MHD) devices are examples of engines operating on direct conversion principles.

In the typical MHD cycle, a working fluid is heated to a state of ionization and made to expand through a magnetic field cutting the lines of force, in effect converting thermal energy into electrical energy. This cycle is of particular interest because it is capable of producing relatively large amounts of electrical energy, there are no moving parts, and much higher temperatures and cycle efficiencies are possible than with some of the other direct conversion and more conventional types of cycles. For example, it has been estimated that in a coal-fired MHD plant, overall cycle efficiency can be increased to 55% from the present 40%. Furthermore, the MHD cycle appears to be suitable for use with nuclear reactor sources of heat which are expected in time to become a major source of electrical power in this country and elsewhere. But if solid nuclear fuel is used, the available temperature is too low for thermal ionization of the working fluid. Hence, attempts are being made to bring about non-thermal ionization of the working fluid, as by radio frequency energy, radiation, and passage through magnetic fields, but heretofore these proposals have not been successful due to high energy inputs required and some very severe stability problems.

There has been developed another approach to the MHD cycle which avoids the ionization problem altogether. If the expanding gas or vapor drives a liquid slug or piston of high conductivity material through a magnetic field, the cycle can be run at low temperatures, and still have high efficiencies. It is closer to the conventional turbogenerator, but differs in that the liquid slug is non-damageable, and requires no bearings. This concept is best fitted to a liquid metal Rankine cycle, because of the high electrical conductivity and efficiency and it is best employed at temperatures above 2000° F., where vapor pressures are high, and can be used either as a topping cycle for power reactors, or as a single cycle for space power generators.

Scientists have worked extensively on such a concept applied to a liquid metal stream accelerated by expansion of metal vapor through a two-phase nozzle. The high velocity liquid is then separated, some of its kinetic energy transformed into electrical energy in a MHD generator, with the balance recovered as a pressure in a diffuser. The main problems are the high liquid velocities (i.e. 500 ft./sec.), low efficiency (i.e. 7%), high nozzle and separator losses, and the low voltage DC output (i.e. 10 v.) of the generator.

The present invention has to do with the use of liquid metal as the working fluid in a magnetic field in such a way as to overcome many of the disadvantages, difficulties and problems which have up to now beset this type of an MHD cycle. By the present invention, an expanding vapor is allowed to push liquid metal slugs through a generator, the expansion energy being converted directly into electrical energy, instead of first to kinetic and then to electric energy, as in the two phase nozzle arrangement. Higher source pressures are then possible, and cycle efficiencies of about 20% at low liquid velocities (50-100 ft./sec.) are feasible. Also, since the generator electrodes see an intermittent uni-directional slug, it can deliver a low-voltage AC (i.e. 10 v.) that can be easily transformed to a high voltage (i.e. 10,000 v.) if desired.

It is thus a first object of this invention to provide an MHD generator in which the working fluid is not thermally ionized.

A further object of the invention is to provide apparatus for utilizing a nuclear source of heat in an MHD generator.

Another object is an MHD cycle utilizing a liquid metal working fluid in a magnetic field.

Still another object is an MHD cycle capable of delivering a low voltage AC output.

Other objects and advantages of this invention will hereinafter become evident from the following description of preferred embodiments of this invention taken with the accompanying drawings in which.

Figure 1:
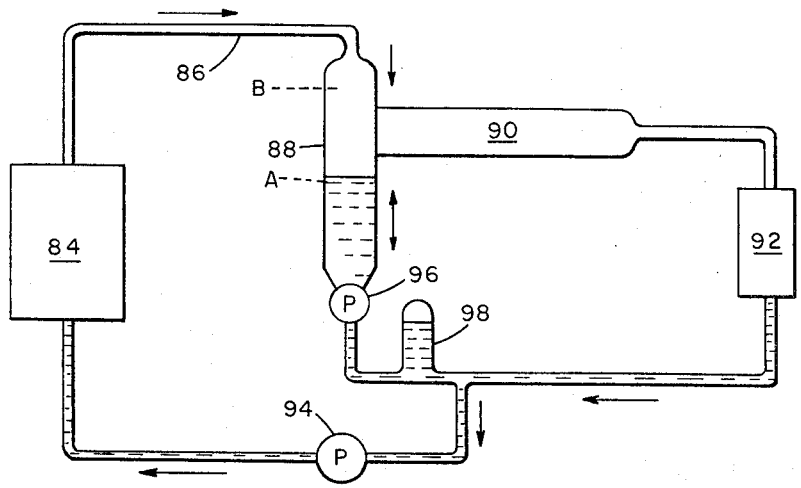
FIG. 1 shows a preferred embodiment utilizing a once-through MHD generator arrangement incorporating the principles of this invention.

Referring to FIG. 1 there is shown a nuclear reactor boiler 84 in which potassium vapor is generated. The potassium vapor is carried by way of a conduit 86 to a column 88 which supplies once-through MHD generator 90. The exhausted vapor from generator 90 is passed to a condenser 92 where the potassium is liquefied by cooling. A feed pump 94 returns the liquid potassium to boiler 84 as indicated by the arrows. Column 88 incorporates near the bottom thereof a pulsating flow pump 96 connecting the column as illustrated to the low pressure side of feed pump 94. A surge tank 98 is utilized to maintain a desired pressure as will be explained later.

In the operation of the arrangement just described, pump 96 supplies potassium upwardly into column 88 cyclically against the pressure of the high pressure side of the system. Typically there would be about 20 pulses per second, which would result in the potassium level moving during a pressure pulse from a level column 88 such as at A below generator 90 to a level B above generator 90. In other words the entrance to generator 90 in column 88 would be alternately exposed to liquid potassium and vaporized potassium.

Figure 2:
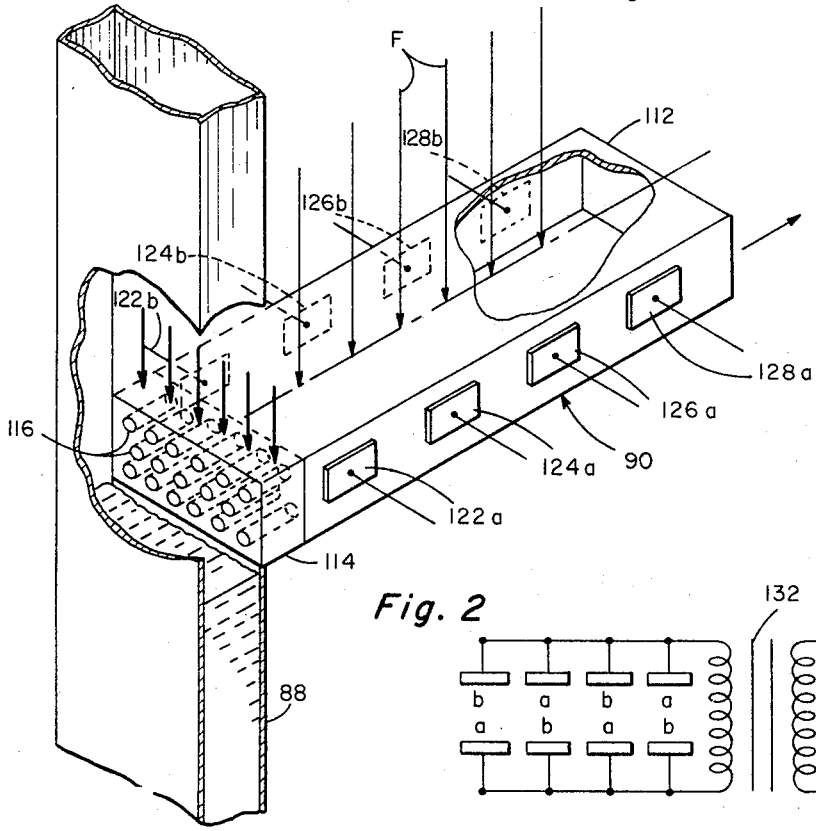
FIG. 2 shows the details of the generator shown in the arrangement of FIG. 1.
Figure 3:
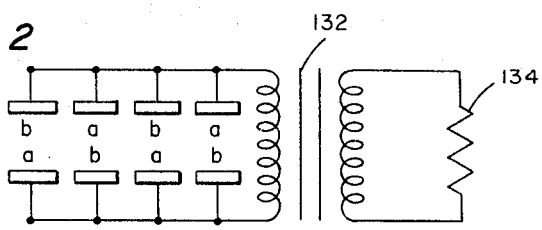
FIG. 3 shows how the electrodes of FIG. 2 are wired to the point of use.

Referring to FIG. 2, it will be seen that generator 90 consists of a hollow right angled parallelepiped chamber or unit 112 having at one end thereof a frit 114 with a plurality of holes 116 through which the liquid potassium enters generator 90. Holes 116 increase slightly in diameter in the direction of fluid flow so that at the entrance, frit 114 is 50% open and at the exit it is about 90% open. The liquid potassium is supplied to frit 114 from column 88 under the highest pressure of the system in pulses as previously described. Mounted along opposite walls of unit 112 are oppositely facing electrodes 122a and b, 124a and b, 126a and b, 128a and b which would be connected as illustrated in FIG. 3 through a power transformer 132 to a suitable load 134. It will be seen from FIG. 3 that successive pairs of electrodes are reversibly connected to transformer 132 thereby producing the desired A.C. output.

A magnetic field whose flux lines are indicated by arrows F are imposed upon generator 90 perpendicular to lines connecting oppositely facing electrodes as illustrated. A suitable material for unit 112 would be stainless steel or tungsten carbide which have high temperature resistance and fairly high resistance to electric current. The relatively thin wall of unit 112 between each electrode and the liquid metal slugs do not offer significant resistance to electric current flow because of the large areas exposed. Electrodes 122–128 would be made from highly conductive metal such as copper. Potassium is suitable as the liquid metal as it is light in weight, is relatively easily handled, and much is known about its characteristics.

In the operation of generator 90, it is readily apparent that with the potassium at level A, metal vapor flows through frit 114 and through unit 112. When the liquid level rises to B above frit 114, the liquid potassium penetrates frit 114 and enters unit 112. When the liquid level drops once again the vapor pressure is applied to the liquid potassium in frit 114 and the liquid is driven in the form of a slug down the length of unit 112, at speeds as high as 300 cm./sec. and producing much higher frequency output signals than any of the previous arrangements suggested heretofore.

The slugs of potassium being discharged successively from frit 114, have lengths which are determined by the point at which they break away from frit 114, and in some arrangements it has been found to be of the order of 6″. Eventually, if generator 90 is long enough, the slugs themselves will break apart. Typically the length of generator 90 should not exceed 8 to 10 times the length of the slugs emerging from frit 114.

The magnetic fields in all of the described arrangements are maintained at uniform value, preferably of the order of 4% spread or less, to obtain maximum efficiencies.

It is thus seen that there has been provided a unique application of MHD to liquid metals and nuclear reactor sources. This invention makes it possible to apply the principles of MHD without relying on thermal ionization which heretofore has imposed temperature limitations on such apparatus.

While a preferred embodiment of this invention has been described it is understood that the invention is not to be limited thereto but is to be defined only by the scope of the appended claims.

I claim:
1. Magnetohydrodynamic electrical generation apparatus comprising:
  (a) heat means to vaporize liquid metal at relatively high pressure;
  (b) means for expanding said vapor and producing electrical energy;
  (c) means for condensing said vapor and returning the condensed vapor under pressure to said heat means for vaporization;
  (d) said expanding means including an extended tube containing for movement in one direction from the inlet to the outlet of said tube a series of slugs in succession of said liquid metal driven by said vapor during expansion, a porous element at the inlet of said tube to permit the formation of slugs in said tube, means establishing a magnetic field whose lines of force extend through the path taken by said slugs at an angle to the direction of motion of said slugs, and means for carrying away electric current produced by an EMF across each of said slugs developed by the cutting of said lines of force by each said slug; and
  (e) means to expose said porous element cyclically to liquid metal under pressure and metal vapor under pressure, exposure of liquid metal forming a slug in said porous element and subsequent exposure of vapor accelerating the formed slug down through said tube, said liquid metal of the slug and vapor mixing upon leaving said tube and entering said condensing means together.

2. The apparatus of claim 1 having a vertical supply column with an opening in the intermediate portion thereof connected to supply said porous element at the inlet of said tube, the upper end of said column being exposed to liquid metal vapor under pressure from said vaporizing means, the lower end of said column being exposed to a source of liquid metal, means in the lower portion of said column to pressurize said liquid metal within said column to establish a liquid level therein and to pulse said liquid in said column to cause said level to fluctuate between points above and below said opening into said porous element, thereby causing successive slugs of metal to be formed in said element and driven down the length of said tube by vapor under pressure.

3. The apparatus of claim 1 in which said porous element is a frit member having openings extending therethrough, said openings increasing in diameter in the direction of fluid flow.

References Cited
UNITED STATES PATENTS

| | | | |
|---|---|---|---|
| 1,916,076 | 6/1933 | Rupp | 310—11 |
| 2,362,283 | 11/1944 | McCullom | 310—11 |
| 3,127,528 | 3/1964 | Lary et al. | 310—11 |

MILTON O. HIRSHFIELD, *Primary Examiner.*

D. X. SLINEY, *Assistant Examiner.*